United States Patent [19]

Green

[11] Patent Number: 4,600,586

[45] Date of Patent: Jul. 15, 1986

[54] LIVESTOCK FEED LOT ADAPTATION COMPOSITION AND METHOD

[76] Inventor: Milton L. Green, R.R. 1, Mitchell, Nebr. 69341

[21] Appl. No.: 521,154

[22] Filed: Aug. 8, 1983

[51] Int. Cl.$^4$ .............................................. A23K 1/02
[52] U.S. Cl. ......................................... 426/2; 426/72; 426/74; 426/658; 426/807
[58] Field of Search ..................... 426/2, 74, 807, 656, 426/658; 424/31; 514/738

[56] References Cited

U.S. PATENT DOCUMENTS

| | | | |
|---|---|---|---|
| 3,617,299 | 11/1971 | Mattoon | 424/31 |
| 3,791,241 | 2/1974 | Frankenfeld et al. | 514/738 |
| 4,000,318 | 12/1976 | Ferguson et al. | 426/2 |
| 4,202,887 | 5/1980 | Talbot et al. | 426/2 X |
| 4,419,369 | 12/1983 | Nichols et al. | 426/2 |

OTHER PUBLICATIONS

Cole et al., "Influence of Pretreatment Feeding & Post-Treatment B Vitamin Supplementation on Stressed Feeder Steers", J. Am. Science 1979, vol. 49, pp. 310–317.
Fralick et al., "Effects of Propylene Gycol & Protein Level on the Growth of Young Pigs" 71st Meeting Am. Soc. of Animal Science, Tuscon, Az. (1979).
Weakley et al. "Propylene Glycol & Feed Intake by Steers" Ag. Exp. Stat. Okla. State Univ., Jun. 1982, pp. 147–149.
Shisa et al. "Effects of Propylene Glycol on Growth & Rumen Volatile Acids of Lamb" Jap. J. of Zootech. Sci. 1975, vol. 46, pp. 334–341.
Morrison Feeds and Feeding, Morrison Publishing Co. (1957), 22nd edition, p. 547.

*Primary Examiner*—R. B. Penland
*Attorney, Agent, or Firm*—Zarley, McKee, Thomte, Voorhees & Sease

[57] ABSTRACT

A method and composition designed especially to reduce livestock adaptation stress when livestock are transported. The composition comprises as major ingredients, molasses, preferably beet molasses, and propylene glycol and as minor ingredients, protein mix, vitamin mix, trace mineral mix, major mineral mix, and amino acids. Each of the ingredients are separately admixed with propylene glycol until substantial homogeneity is achieved, followed by adding each of the separately mixed ingredients to beet molasses. Thereafter, mixing is continued until complete homogeneity is achieved. The result of individual mixing of each minor ingredient with propylene glycol, prior to admixing all with beet molasses, provides a synergistic result in significantly reducing livestock stress during adaptation to new feed lot environments. The correction of the stress results in improved performance and reduced death loss.

13 Claims, No Drawings

LIVESTOCK FEED LOT ADAPTATION COMPOSITION AND METHOD

BACKGROUND OF THE DISCLOSURE

Many links in the chain of successful livestock production exist todaY. Each link or step is conducted in the geographic area which best utilizes the natural resources of the country. The cow-calf and the stocker-feeder operations are not usually adjacent to the confined finishing and slaughter processing facilities.

The cow-calf and stocker-feeder operations are by necessity located in the areas of open range and utilize roughages on lands which in general are not suited to intense agriculture food grain production, or they are adjacent to agriculture utilizing non-edible by-products of other grain and crop production.

The finishing-processing operations are usually near a bountiful supply of feed grains and near the slaughter processing facilities.

This geographic dislocation brings about multiple ownership throughout the red-meat food chain for cattle. It necessitates moving the livestock great distances, sometimes over thousands of miles from the grower areas to the finishing and processing areas. The geographic distribution of the stocker-feeder set the stage for many varying levels of animal husbandry and a great variance range in nutrition adequacy and/or deficiencies.

The net result is animals arriving to finishing facilities with all degrees of adequate and inadequate nutrition and the resulting nutrient levels of their tissues.

Shipping and handling stress coming at this time aggravates the deficiencies already existing and can cause other or increase deficiencies in the host animal and the rumen microbes.

This stress comes at a most inopportune time, the period of "Lot Adaptation", the period of least resistance and the period in the feeding program when the animals are challenged to create an immune response to build immunity to protect them during the remaining feeding period. The result is a period of highest disease incidence and animal health problems.

Lot adaptation is also a period of abrupt feed changes and the energy challenge in the feeding program to accomplish the production goals in the least amount of time possible.

The pathologies resulting from the above husbandry procedure are associated with the deficiencies of the geographic area of the source of the cattle, the deficiencies of the host animal and the deficiencies of the microbes of the rumen population must be addressed.

The transportation animal pathologies from stress and lack of food and water in transit are complex and a multiplicity of inner-actions exists.

The loss of energy in transit results in hypoglycemia to the rumen eco-system and the host animal with consistent slight ketosis during re-alimination. This hypoglycemia if not corrected can interfere with antibiotic response if it is needed to treat infectious diseases present.

A pronounced easinepia can exist when visible symptoms of ketosis appear. Hypoglycemia can also cause nervous irritability and further aggravate stress. In transit, loss of energy to the rumen microbes results in rapid depletion of the microbe population, the most pronounced clinical manifestation being loss of digestive functions due to a reduction of the normal cellulotic activity.

The microbial death of the rumen microbe eco-system is more time sensitive to lack of energy and proper nutrients than the death of the host animal. Starvation from inadequate energy begins within hours and fifty percent death can result in thirty to forty hours. Rumen pH of the eco-system increases as does the level of ammonia and lactates in the paunch media.

Long periods of water deprivation or short periods of water deprivation with elevated ambient temperatures results in reduced feed intake, and increased temperature. The body systems respond with corrective measures of blood volume, the kidney reacts conservatively, this results in the excretion of essential minerals as it struggles to maintain a correct osmotic mineral equilibrium in the cells of the host animal.

Mineral pathologies from deficiencies of origin and as a result of transportation and marketing stress exist. The deficiencies can be of the major and/or minor mineral group in animal nutrition and be evident for the rumen microbe population and the host animal.

Protein and vitamin deficiencies exist for the same reasons as listed above and they become evident to the rumen microbes and the host animal. The degrees of pathology developed depends on the severity and length of stress and the lack of adequate nutrition from the geographic area of origin.

Lot adaptation is the most critical husbandry period for the symbiotic-relationship that exists between the microbes of the ruminant and he host ruminant animal. There is no period of time in the feeding period that this symbiotic inter-dependence is more important. The proper and timely return of normal physiologic and peak function is of the most value to the owner for economical and efficient beef production.

Inadequate protein to the host animal can interfere with growth and the immune response.

Inadequate energy and resulting hypoglycemia interferes with appetite, causes clinical and sub-clinical ketosis and the potential lack of response to parenteral antibiotics.

The rumen microbes function in energy utilization, protein synthesis, mineral and vitamin utilization.

Microbial death of the ruminant eco-system will aggravate deficiencies of the host animal and seriously delay or prevent the animal's recovery to a normal state of physiology.

Therefore, any husbandry which interferes with the metabolism of the ruminant microbes will interfere with the metabolism of the host animal.

Conversely, any product which corrects the pathology of the systems of the rumen microbe population and the host, with speed, will hasten the correction of the pathology and return the host animal to an economic producing animal in the least time possible.

This invention involves a feed supplement which can be free choice fed, used as a drench or as a top dressing incorporated in the feed, and which has as one of its primary ingredients, propylene glycol. It has heretofore been recognized that propylene glycol can be an effective carrier for minerals and other supplements, see for example, Talbot, U.S. Pat. No. 4,202,887, issued May 13, 1983. However, what has not heretofore been appreciated or, as far as the inventor is aware, ever known, is that a synergistic occurrence happens when a feed supplement containing propylene glycol is made in the special manner in accordance with this invention.

The synergistic result is that such a feed supplement is effective for significant reduction in lot adaptation stress. If the same ingredients are mixed in a manner not in accordance with this invention, for example, simply lumping all of them together, the adaptation stress reduction in a short period of time is not achieved. While not wishing to be bound by theory, it is believed this result occurs because of the increased metabolic utilization of the nutrients which have been individually premixed with the propylene glycol.

Accordingly, a primary objective of the present invention is to provide a method for preparing a feed supplement which when administered will significantly reduce lot adaptation stress.

Another objective of the present invention is to prepare a feed supplement which when fed, corrects the pathology of the systems of the rumen microbe population, as well as the pathology of the livestock's own system, in such a manner that the host animal is quickly returned to an economic producing animal, in the shortest time possible.

Another objective of the present invention is to provide a lot adaptation feed supplement which aids in quickly reestablishing the symbiotic relationship that exists between the microbes of the ruminant and host ruminant animal.

Another objective of the present invention is to provide a livestock feed supplement which not only is effective in reducing lot adaptation stress during the initial days after an environment change, but also which provide continuing benefits throughout the entire finishing period, with a showing of significant economic benefits.

The method and manner of accomplishing each of the above objectives will become apparent from the detailed description of the invention which follows.

SUMMARY OF THE INVENTION

A method of preparing a feed supplement which comprises as major ingredients, molasses, preferably beet molasses, and propylene glycol, and as minor ingredients, at least protein mix, vitamin mix, trace mineral mix, and amino acids. In accordance with the method, each minor ingredient is separately and individually mixed with a small but effective amount of propylene glycol until substantial homogeniety is attained. Thereafter, each of the minor ingredient-propylene glycol components are themselves added to the beet molasses ingredient, and the remainder of the propylene glycol, if any, and mixing is continued until substantial homogeniety is achieved.

When this feed supplement composition, prepared as previously described, is administered to animals undergoing lot adaptation stress for from about 6 to about 12 days after environment change, lot stress is significantly reduced, and the animals are more quickly returned to a state of normalcy, and a more efficient livestock producing unit.

DETAILED DESCRIPTION OF THE INVENTION

The major ingredients of the composition of the present invention are molasses and propylene glycol. The amount of molasses can vary from about 25% to about 75% by weight of the composition. Preferably the molasses is beet molasses. It has been found that the synergistic action, attained by the process of this invention, is enhanced if the molasses that is employed is in fact beet molasses. The preferred beet molasses has a total invert sugar content of from about 56.5% to about 65%, with a total overall sugar solids content of about 48% being preferred as is a pH of about 7.5 and 79.5 brix. The preferred range of total solids content for the beet molasses is from about 65% to about 75%.

The other major ingredient of the composition is propylene glycol. The preferred amount of propylene glycol varies within the range of from about 1.5% by weight of the composition to about 15% by weight of the composition, with the preferred range being from about 5% to 14% by weight of the composition. The other ingredients are characterized as "minors". However, it should be understood that the term "minors" is not being used from the standpoint of their effect on the composition, but merely from the standpoint of a characterization of the amount that is present in comparison with the much higher weight percent levels of molasses and propylene glycol. The minors can vary from time to time depending upon the feed lot situation, but in most instances will include at least a protein mix, a vitamin mix, a major mineral mix, a trace mineral mix and an amino acid mix. The precise composition of each of these ingredients can also vary as desired without significantly changing the synergistic effect of the formulation composition. In other words, the ingredients can be tailored to the precise situation present in the feed lot animals. In most instances, however, it will almost always be that the ingredients will include protein mix, vitamin mix, major mineral mix, trace mineral mix and amino acids. The amount of the protein mix can be from 5% to 50%; the amount of the vitamin mix can be from 0.1% to 10%; the amount of the trace mineral mix can be from 0.4% to 5%, major mineral mix, i.e., calcium, phosphorous, potassium, nagnesium, 2% to 10%; and, the amount of amino acid mix can be from 10% to 70%.

With regard to the protein mix, typical ingredients contained therein can be natural protein from distillation solubles, materials often regarded as "chemical protein precursor" ingredients such as ammonium polyphosphate, ammonium phosphate, diammonium phosphate and urea.

The vitamin mix, as is preferred for processing, can be divided into a fat soluble mix portion including vitamins A, D and E and a water soluble vitamin portion including thiamine $B_1$, choline, riboflavin $B_2$, niacin, pantothenic acid, pyridoxine $B_6$, folic acid, biotin, and vitamin $B_{12}$.

The trace mineral mix, as is the case with the others, can vary in composition depending upon the condition of the animals being treated. Typically, however, the trace mineral mix will include zinc salts, manganese salts, iron salts, magnesium salts, copper salts, and cobalt salts, all preferably sulfate. In addition, the major minterals mix may include calcium in the form of calcium carbonate, chloride and/or sulfate, and sodium salts, such as sodium selenite and sodium selenate, and magnesium salts in the form of magnesium sulfate and often magnesium oxide, as well as potassium salts.

The amino acids are employed as amino acid solutions of methionine, lysine, glutamic acid, leucine, valine, alanine, glycine, aspartic acid, theonine, isoleucine, phenyl alanine, tryptophane, histodine, and arginine, as well as proline, serine, threonine, tyrosine, etc. The amino acid mix is a water solution, preferably with a solids content of from 30% to 60%.

In accordance with the method of this invention, each of the ingredients are separately admixed with a small but effective amount of propylene glycol, but with mixing continuing until substantial homogeneity is achieved. If the minors are soluble in propylene glycol, homogeneity will be achieved rapidly. If, however, they are not soluble, mixing may take a longer period of time. Generally, an amount of mixing of from about five to about ten minutes is sufficient. The amount of propylene glycol admixed with each individual component may vary from an equal weight amount up to several times an equal weight amount. However, with a minor ingredient having a substantial amount of water present, such as the amino acid, one can use considerably less than equal weight amounts, and in fact, as low as from about 10% to 15% by weight of the aqueous amino acid solution. Thus, the amounts that are expressed herein as equal amounts or up to twice an equal amount, are absolute weight amounts for each of the ingredients with the exception of the amino acid ingredient, which it is understood, is an aqueous solution. However, if one bases the amount of propylene glycol on the amount of solids present in the amino acid solution, then the general rule of an equal amount up to twice as much propylene glycol, applies. But if it is on a water basis, 10% to 15% by weight of the aqueous solution, assuming a concentration equal to that shown in the examples hereinafter.

While the above description has referred to physical mixing until homogeneous, it should be understood that in addition, a chemical phenomenon occurs between the propylene glycol and the ingredients. The minerals will chelate or coordinate with the propylene glycol; the fat soluble vitamins form a covalent adduct with propylene glycol by reversible conjugate addition and/or are involved in nucleophilic displacement or reversible hemiketal formation. This alters the partition coefficient and speeds the uptake, because of the resulting co-solvent action, that is mass action solubility. The water soluble vitamins and the amino acids both have improved mass action solubility because of their soluble nature in propylene glycol.

The temperature during this admixing does not appear to be important. Satisfactory results are obtained when each of the minor ingredients is at room temperature. The same is true with the propylene glycol.

After each of the individual components are separately admixed with the propylene glycol, they are thereafter added to the molasses ingredient. Mixing is continued for about another ten to fifteen minutes to assure substantial homogeneity. The product is now ready for use as a feed supplement.

The beet molasses ingredient is preferably at a temperature of about 100° F. prior to addition of the separately admixed minors-propylene glycol mixture. For process reasons, this has been found most desirable, although it is certainly not essential.

Certain other processing techniques are worthy of note. For example, the vitamin mix can be separated into a fat soluble portion and a water soluble portion, and ideally each is separately admixed with its own weight of propylene glycol prior to admixing them together.

For reasons that are not precisely understood, because of the uncertainty of the complete metabolic pathway, but clearly demonstrated in proven data, when the same composition is prepared but the ingredients are all simply lumped together and admixed, the composition is not nearly as effective as a treatment for lot feed adaptation stress. While the applicant does not wish to be bound by any theory, it is believed that the invention results are obtained because each one of the ingredients are individually and homogeneously admixed with the propylene glycol to allow the previously referred to intermolecular phenomenon to occur between each of the ingredients and the propylene glycol. This assures the necessary association and the intermolecular phenomenon such that the propylene glycol becomes an effective mainline carrier of the essential supplemental ingredients directly to the blood stream of the animal, and as well, to microorganisms in the rumen of the animal. As a result, both the microorganisms in the rumen, and the host animal itself, are properly, and quickly, and efficiently, returned to their normal symbiotic relationship, necessary for fast and efficient animal performance.

The feed supplement of this invention can be effectively used as a drench, or top dressing mixed in the feed ration and fed in a free choice manner. While the most dramatic effect is seen during the early part of the feeding period (first 30 days), the data does show continued economic advantage during an entire finishing period.

The following examples are offered to further illustrate but not limit the process, composition and method of this invention.

EXAMPLES

In each of the examples shown below for feed lot data, the composition used was prepared in the following manner.

A trace mineral mix, four pounds, which comprised 24.26% zinc sulfate, 24.26% magnesium sulfate, 16.04% iron sulfate, 23.76% magnesium sulfate, 3.17% copper sulfate, 3.17% cobalt sulfate, and 5.34% ethylene diamine hydroiodide was employed. Four pounds of this trace mineral mix were mixed with an equal amount of propylene glycol in a 6300 rpm mixer for ten minutes, until substantial homogeneity of the mix was obtained.

A 14 ounce package of fat soluble vitamins sold under the trademark Rovimix AD$_3$ and Rovimix E-40% by Roche Chemical Division of Hoffmann, LaRoche, Inc. was mixed with two pounds of propylene glycol in a similar manner for ten minutes at 6300 rpm.

Choline chloride, ten pounds, was mixed with ten pounds of propylene glycol for ten minutes at 6300 rpm.

Two ounces of thiamine chloride were mixed with one pound of propylene glycol for ten minutes at 6300 rpm.

Two pounds of methionine were mixed with two pounds of propylene glycol for ten minutes at 6300 rpm.

One pound of leucine was mixed with one pound of propylene glycol for ten minutes at 6300 rpm.

One pound of niacin was mixed with one pound of propylene glycol for ten minutes at 6300 rpm.

14.5 pounds of ammonium polyphosphate was mixed with ten pounds of propylene glycol for ten minutes at 6300 rpm.

Eight hundred pounds of 48% aqueous amino acid solution was mixed with 90 pounds of propylene glycol for ten minutes at 6300 rpm. The amino acid solution which had a solids value of 48% comprised 7.9% alanine, 4.1% arginine, 8.8% aspartic acid, 14.3% glutamic acid, 5.5% glylcine, 2.9% histodine, 4.3% isoleucine, 8.1% leucine, 6.0% lysine, 1.3% methionine, 3.8% phenylalanine, 8.1% proline, 4.2% serine, 4.4% threonine, 2.9% tryosine, 0.6% tryptophane, and 5.7% valine.

One hundred pounds of filler suspension clay solution (10% sepiolite clay solution), 66 pounds of calcium carbonate, were mixed for five minutes at 6300 rpm. Thereafter, five pounds of potassium chloride was added with mixing continuing for five additional minutes, and 79 pounds of propylene glycol were then added to this portion of the mineral mix, with mixing continued another 15 minutes until substantial homogeneity was achieved.

Thereafter, each of the above separately mixed ingredients was added to a 665 pound batch of beet molasses, and mixing was continued until homogeneity was achieved, that is, for about ten additional minutes. The beet molasses had a solids content of 48% and 79.5 brix. The total batch weight was 2000 pounds. The beet molasses was at 100° F. and all of the remaining ingredients were at room temperature. The total weight percent basis of beet molasses in this batch was 32.25%. The total weight percent basis of propylene glycol in this batch was 9.5%.

This 2000 pound batch, or batches fully equivalent to this, were used in the feed lot test data shown below.

In the control shown in the test data below, a batch of exactly similar composition was prepared, except that individual ingredients were not separately admixed with propylene glycol, but all were simply dumped into the batch mixture simultaneously, along with the molasses and propylene glycol and admixed for 15 minutes. This latter composition where in toto mixing all at once was practiced, is referred to in the data below as "control".

TABLE I:

In Table I shown below, the cattle employed were all weaning calves which were shipped 170 miles to a growing facility. In transit shrink was noted to be the same in both groups, that is, the group treated in accordance with the invention and the control group. The cattle were arbitrarily separated into two equal groups, one for invention treatment, and one for control treatment. Their in-weight was taken, and their weight at the end of 28 days was noted. Each of the cattle were fed in the bunk on a top dress mixed, feed basis, either the invention or the control, for a period of ten days. Data was continually taken for a total of 28 days. The results are shown in Table I.

TABLE I

|  | INVENTION | CONTROL |
|---|---|---|
| IN WEIGHT | 426# | 427.0# |
| 28 days weight | 476# | 465.1# |
| Shrink | 6.5% | 6.5% |
| Total gain | 50# | 38.1# |
| Feed consumption | 13.348# | 12.253# |
| Cost per day | 51.231¢ | 47.201¢ |
| Gain/lb/day | 1.786 | 1.361 |
| Cost/lb/gain | 28.685 | 34.681 |
| Efficiency* | 119% | 103% |
| Conversion | 7.47 | 9.00 |
| Number fed | 1801 | 327 |
| RESULTS: |  |  |

1. Increased gain by .425/lb/day
2. Increased fed efficiency 13.5%
3. Improved cost of gain .0403¢
4. Improved fed conversion $1.63/lb.

*Based on the Net Energy System.

In another experimental test, taken over a fairly extended period of time, the same invention formulation and control formulation were employed with a much larger group of animals, in a variety of different feed lots, testing the efficiency for stress adaptation under a variety of conditions. The results are shown in Table II below:

TABLE II

| Lot # | # Head | Days on Supplement | % Wt. | Gain | P/Gain | Efficiency | Cost/lb/ Gain |
|---|---|---|---|---|---|---|---|
| CONTROL: |  |  |  |  |  |  |  |
| 191 | 154 | 0 | 3.05 | 2.44 | 3.09 | 78.96 | 45.89 |
| 166 | 156 | 15 | 2.71 | 2.38 | 2.78 | 85.61 | 43.00 |
| 17 | 361 | 14 | 2.82 | 3.25 | 3.69 | 88.07 | 44.18 |
| 12 | 91 | 14 | 2.34 | 2.07 | 2.76 | 75.00 | 64.82 |
| 195 | 89 | 10 | 2.46 | 2.55 | 2.90 | 87.93 | 44.36 |
| 180 | 123 | 14.5 | 2.81 | 2.90 | 3.26 | 88.95 | 46.82 |
| 144 | 74 | 32 | 3.05 | 2.90 | 3.52 | 82.38 | 39.82 |
| 177 | 123 | 15.8 | 2.87 | 2.57 | 3.08 | 83.44 | 42.71 |
| 161 | 22 | 27 | 3.26 | 3.35 | 4.58 | 73.14 | 45.81 |
| 14 | 71 | 0 | 2.12 | 2.01 | 2.34 | 85.89 | 61.62 |
| 15 | 47 | 10 | 2.23 | 2.16 | 2.60 | 15.07 | 61.39 |
| 16 | 364 | 10 | 2.65 | 2.89 | 3.25 | 88.92 | 41.36 |
| 10 | 622 | 12 | 2.67 | 2.81 | 3.28 | 85.67 | 43.36 |
| 6 | 418 | 16 | 2.69 | 2.75 | 3.25 | 84.61 | 43.52 |
| 189 | 168 | 27 | 2.72 | 2.17 | 2.67 | 81.27 | 44.17 |
|  | 2883 | 13.54 | 2.71% |  |  | 85.20 | 44.89 |
| INVENTION: |  |  |  |  |  |  |  |
| 9 | 496 | 12.1 | 2.53 | 3.00 | 3.13 | 95.84 | 42.94 |
| 160 | 234 | 25 | 2.80 | 3.13 | 3.41 | 91.78 | 38.39 |
| 158 | 105 | 15 | 2.82 | 3.23 | 3.51 | 92.02 | 37.48 |
| 153 | 148 | 35.7 | 2.59 | 3.00 | 3.07 | 97.72 | 42.27 |
| 4 | 40 | 24 | 2.56 | 2.82 | 2.74 | 102.91 | 46.91 |
| 183 | 136 | 15 | 2.40 | 2.84 | 3.03 | 93.72 | 46.13 |
| 164 | 144 | 13 | 2.42 | 2.47 | 2.47 | 100.00 | 49.14 |
|  | 1303 | 18.9 | 2.58% |  |  | 95.47 | 42.75¢ |

As can be seen, those employing the invention involved a significant increase in efficiency and a decreased cost in pound gained.

It thus can be seen that the invention accomplishes at least all of its stated objectives.

What is claimed is:

1. A method of preparing a feed supplement comprising as major ingredients, molasses, propylene glycol, and as minor ingredients, at least a protein mix, vitamin mix, trace mineral mix, major mineral mix, and amino acids, said method comprising:

mixing each minor ingredient separately with small but stress reducing effective amounts of propylene glycol until substantial homogeniety is attained;

adding each of the separately admixed ingredients to said molasses; and then mixing until homogenous to provide a feed supplement which when fed to domestic livestock, will reduce considerably the length of, and amount of, lot adaptation stress.

2. The method of claim 1 wherein each ingredient is separately admixed with at least an equal weight of propylene glycol.

3. The method of claim 1 wherein each minor ingredient, is mixed with an equal weight amount of propylene glycol for from five to ten minutes.

4. The method of claim 1 wherein the vitamin mix is itself divided into a fat soluble vitamin portion and a water soluble vitamin portion and each is admixed separately with propylene glycol.

5. The method of claim 3 wherein each vitamin portion is admixed with from at least twice its weight of propylene glycol.

6. The method of claim 1 wherein said amino acids are a water solution of amino acids having a solids content of about 40%–50%.

7. The method of claim 1 wherein each of the minor ingredients is admixed with propylene glycol at about room temperature.

8. The method of claim 1 wherein the molasses is beet molasses at about 100° F.

9. The method of claim 1 wherein the total amount of propylene glycol present in the feed supplement is from about 1.5% to about 15% by weight.

10. The method of claim 9 wherein the molasses is beet molasses.

11. The method of claim 10 wherein the amount of beet molasses is from about 25% to about 75% by weight of said feed supplement.

12. The product of the process of claim 1.

13. A method of treating livestock to reduce lot adaptation stress, said method comprising:

administering for from about 6 days to about 12 days after arrival in a new lot, a feed supplement in an amount sufficient to reduce lot adaptation stress, said supplement comprising as major ingredients, molasses and propylene glycol, as minor ingredients at least protein mix, vitamin mix, trace mineral mix, major mineral mix, and amino acids, each of said minor ingredients having been individually admixed with propylene glycol until homogeneous prior to mixing with each other, and said molasses.

* * * * *